United States Patent [19]

Suzuka

[11] Patent Number: 5,412,443
[45] Date of Patent: May 2, 1995

[54] CAMERA HAVING A VARIABLE PHOTOGRAPHING APERTURE AND RETRACTABLE OPTICAL SYSTEM

[75] Inventor: Shinya Suzuka, Saitama, Japan

[73] Assignee: Asahi Kogaku Kogyo Kabushiki Kaisha, Tokyo, Japan

[21] Appl. No.: 45,198

[22] Filed: Apr. 13, 1993

[30] Foreign Application Priority Data

Apr. 13, 1992 [JP] Japan .................................. 4-092501

[51] Int. Cl.⁶ .............................................. G03B 37/00
[52] U.S. Cl. ...................................... 354/94; 354/159; 354/195.1
[58] Field of Search ................. 354/159, 195.1, 195.12, 354/94, 187

[56] References Cited

U.S. PATENT DOCUMENTS

| | | | |
|---|---|---|---|
| 3,470,805 | 10/1969 | Suzuki et al. | 354/469 |
| 3,978,503 | 8/1976 | Shomo | 354/250 |
| 5,010,357 | 4/1991 | Misawa | 354/159 |
| 5,086,311 | 2/1992 | Naka et al. | 354/195.1 |

Primary Examiner—Howard B. Blankenship
Assistant Examiner—J. K. Han
Attorney, Agent, or Firm—Sandler Greenblum & Bernstein

[57] ABSTRACT

A camera is capable of photographing with a plurality of photographing aperture sizes, the largest one of the plurality of photographing aperture sizes being defined. At least one movable plate member is provided for converting a photographing aperture size into one, which is smaller than the largest of the plurality of predetermined photographing aperture sizes, and an optical system capable of advancing and retracting with respect to the camera body intersects with the movement plane of the at least one movable plate member when the optical system retracts. In such a camera, the at least one movable plate member is moved so as not to interfere with retraction of the optical system when it retracts.

34 Claims, 17 Drawing Sheets

CAMERA HAVING A VARIABLE PHOTOGRAPHING APERTURE AND RETRACTABLE OPTICAL SYSTEM

BACKGROUND OF THE INVENTION

The present invention relates to a camera having a changeover mechanism capable of changing a photographing aperture size. The photographing aperture as defined here relates to the size of the opening (inside the camera body) directly in front of the film, that determines the size of the exposed area (and therefore the aspect ratio of the exposed area) of each frame of the film.

Recently, cameras have been developed that have changeover mechanisms for selecting a photographing aperture size from among: a standard size (large photographing aperture size), panorama size, half size (small photographing aperture size), and so on. Conventionally, this type of the camera includes a photographing lens system (photographing optical system) having a photographing lens, lens barrel or the like which retracts inward (i.e., toward the film side) when photographing is prohibited by turning OFF a power supply switch, or the like (when a photographing prohibition mode is set). In this type of camera, a drawback as described below arises. The photographing aperture size changeover mechanism has light shading plates (partial light shading members), and is disposed behind the rear group of photographing lenses. When a photographing prohibition mode is set, the position where the rear group of photographing lenses or the lens barrel for supporting the rear lens group is accommodated is restricted by the light shading plates. This is an obstacle for reducing the size and thickness of a camera.

SUMMARY OF THE INVENTION

It is therefore an object of the present invention to provide a camera having an improved photographing aperture size changeover mechanism which does not restrict the position where the rear group of photographing lenses or a photographing lens barrel for supporting the rear lens group is retracted when a photographing prohibition mode is set by turning OFF a power supply switch, or the like.

For the above purpose, according to the present invention, there is provided a camera capable of photographing with a plurality of photographing aperture sizes, wherein the camera includes:
means for defining the largest one of the plurality of photographing aperture sizes;
at least one movable plate member for converting a photographing aperture size into one, which is smaller than the largest one, of a plurality of predetermined photographing aperture sizes;
an optical system capable of advancing and retracting with respect to the body of the camera, the optical system intersecting with the movement plane of the movable plate member when the optical system retracts;
control means for moving the at least one movable plate member so as not to interfere with retraction of the optical system when the optical system retracts.

Optionally, the control means includes a mechanism for changing the photographing aperture size, wherein the mechanism is biased so that in its rest position the photographing aperture size is set to the largest one of a plurality of photographing aperture sizes, and wherein the smaller one of the plurality of photographing aperture sizes is set when the mechanism is driven against the biasing force. Further, the control means includes an operation member for driving the mechanism, the operation member being capable of turning on or off the power of the camera, and wherein the operation member does not drive the mechanism when the operation turns off the power.

Alternatively, the control means includes a mechanism for changing the photographing aperture size, wherein the mechanism is biased so that in its rest position the photographing aperture size is set to a smaller one of the plurality of photographing aperture sizes, and wherein the largest one of the plurality of photographing aperture sizes can be set when the mechanism is driven against the biasing force. In this case, the control means includes an operation member for driving the mechanism, the operation member being capable of turning on or off the power of the camera, wherein the operation member does not drive the mechanism when the operation turns off the power, and wherein a cam structure is provided between the optical system and the mechanism, the cam structure driving the mechanism to set the largest one of the plurality of photographing aperture sizes when the optical system is retracted.

According to another aspect of the invention, there is provided a camera capable of photographing with a plurality of photographing aperture sizes, wherein the camera includes:
means for defining the largest one of the plurality of photographing aperture sizes;
at least one movable plate member for converting a photographing aperture size to one, which is smaller than the largest one, of the plurality of photographing aperture sizes;
a retractable optical system, wherein the optical system is advanced when photographing is enabled, while the optical system is retracted inward when photographing is prohibited, the optical system intersecting with the movement plane of the one or more movable plate members when retracted; and
control means for moving the one or more movable plate members so as not to interfere with retraction of the optical system when photographing is prohibited.

DESCRIPTION OF THE ACCOMPANYING DRAWINGS

DESCRIPTION OF THE EMBODIMENTS

Figure 7:
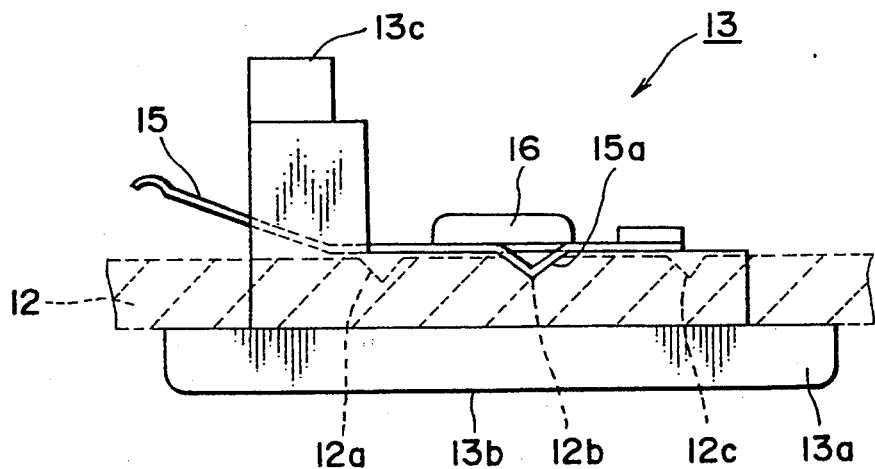
FIG. 7 is a top view of a switch.
Figure 8:
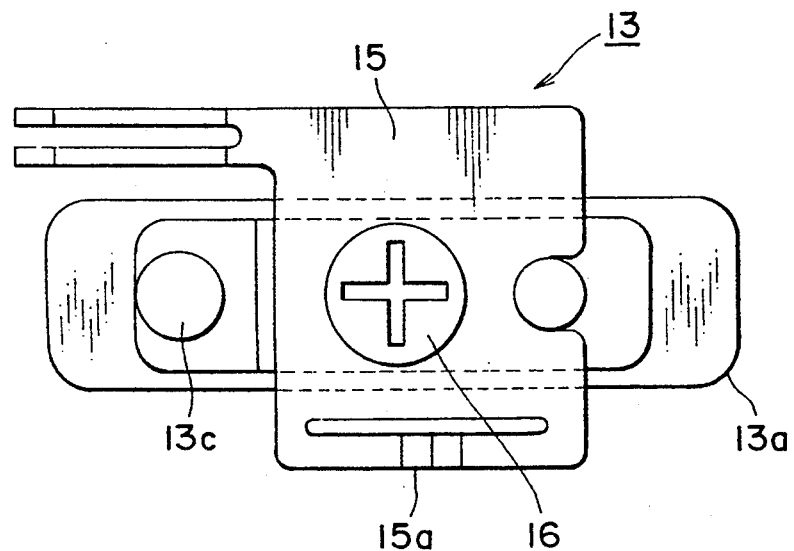
FIG. 8 is a side view of the switch.
Figure 9:
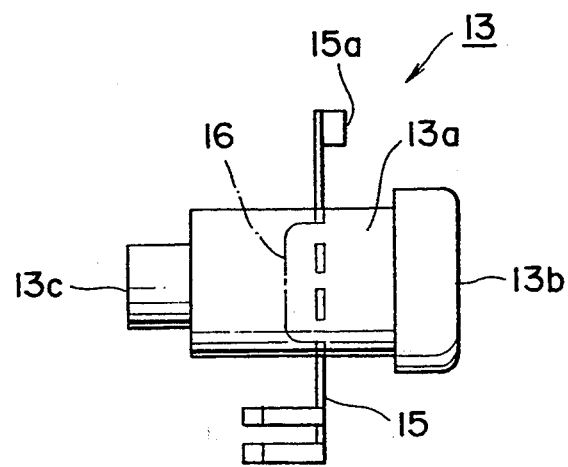
FIG. 9 is a front view of the switch.
Figure 10:
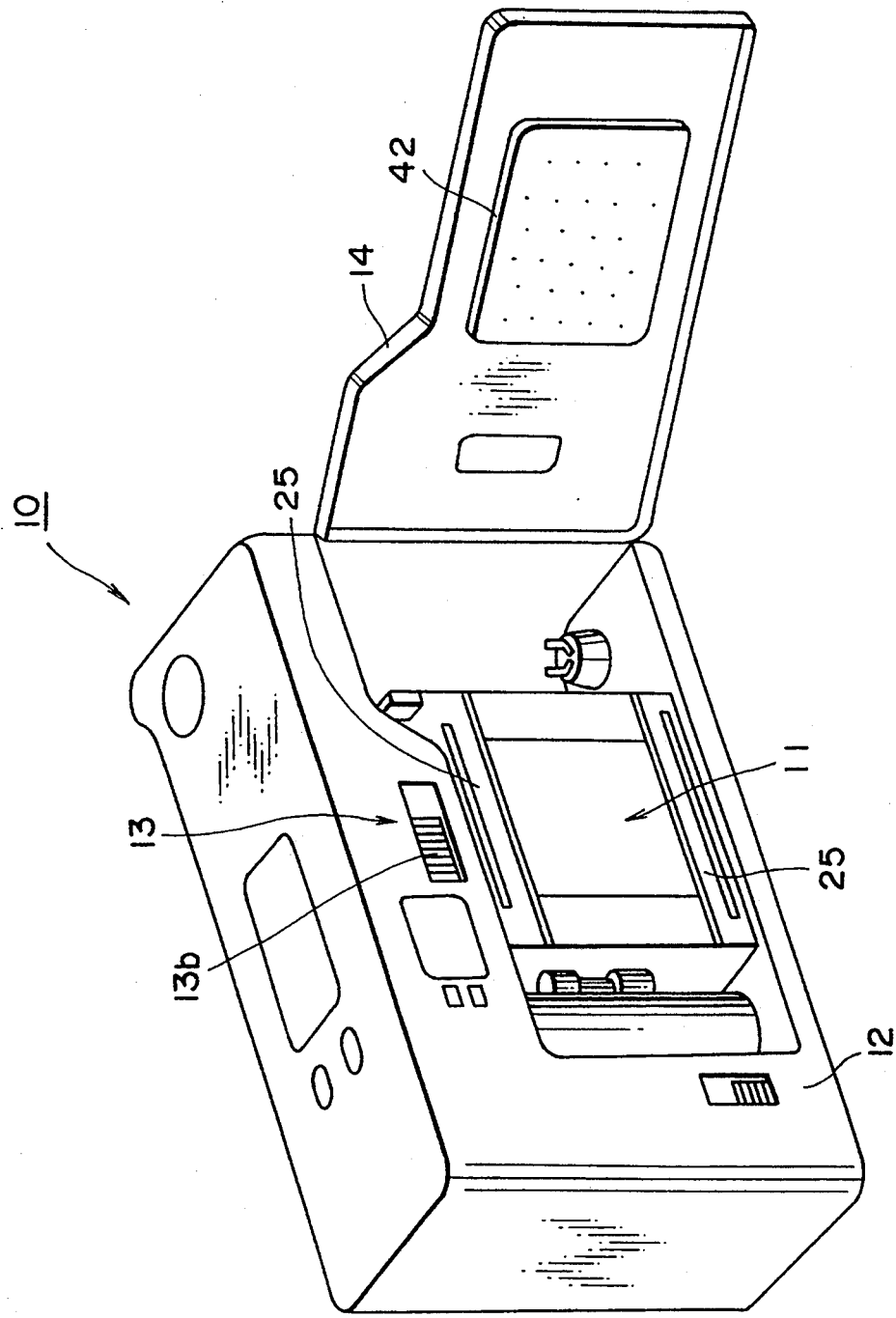
FIG. 10 is an external perspective view of a camera having a photographing aperture size changeover mechanism to which the present invention is applied.

The present invention will be described below with reference to embodiments shown in the figures. As shown in FIG. 10, a switch 13 (changeover means) having the function as an operation switch for the power supply circuit of a camera 10 and the function as an operation switch for a photographing aperture size changeover mechanism is disposed at the upper portion of the rear wall 12 of the camera 10. The structure of the switch 13 is shown in FIGS. 7 to 9. The switch main body 13a is inserted into an inserting hole (not shown) formed on the rear wall 12 and having a predetermined length in the right and left directions in FIG. 7, with the operation unit 13b thereof located on the outside of the rear wall 12. Then, a contact brush 15 is fixed to the switch main body 13a by a screw 16 and attached to the inner surface of the rear wall 12 by said screw 16. The switch main body 13a can slide in the right and left directions in FIG. 7 with respect to the rear wall 12 within the range of the length of the aforesaid inserting hole (not shown). An engaging portion 15a formed to a portion of the contact brush 15 can be engaged with one of the right, middle or left grooves 12a, 12b or 12c respectively formed on the inner surface of the rear wall 12, and can be stopped by a click. The contact brush 15 can slide to contact a contact plate (not shown) to turn ON and OFF the power supply circuit of the camera 10. When the switch 13 is stopped by click on the left side, the power supply is turned OFF (photographing is prohibited); when the switch 13 is stopped by click at the mid position, as illustrated in FIG. 7, the power supply is turned ON (photographing is enabled) and photographing is enabled with a standard photographing aperture size (large photographing aperture size), and when it is stopped by a click on the right side, the power supply is turned ON (photographing is enabled) and photographing can be effected using a panorama photographing aperture size (small photographing aperture size). FIG. 7 shows the condition that the switch 13 is at the mid position of the click stop. An engaging pin 13c is integrally provided with the switch main body 13a. The engaging pin 13c functions when a photographing aperture size is changed as it is engaged with the engaging projection 26c of a drive ring 26 to be described below.

A chassis 25 is fixed to the object side surface (i.e., inner surface) of the rear wall 12 at the upper and lower positions of an opening 11 in the camera 10 by a known means. The chassis 25 determines the size of the opening 11 in the upper and lower directions when a large photographing aperture size Is selected. Further, as shown in FIGS. 1 to 6, the chassis 25 functions as a base plate for supporting a pair of upper and lower light shading plates 21 (partial light shading member); an annular drive ring 26 provided to support and move the light shading plates 21; a drive lever 22; and associated hardware.

The drive ring 26 is an annular member surrounding the opening 11 and disposed Just in front of the light shading plates 21 in the optical axis direction. When a photographer operates the switch 13, the drive ring 26 is rotated to move the light shading plates 21 using a linkage structure composed of drive levers 22, 23.

The photographing aperture size changeover mechanism will be described in detail below.

The chassis 25 includes pin portions 25a protruding on the object side. The drive ring 26 includes slots 26a into which the pin portions 25a are inserted. Thus the drive ring 26 is rotatable within the range of the length of the slots 26a. Further, the drive ring 26 is biased in the clockwise direction by spring 27 as shown in the figure. The spring 27 has an end hooked to a locking projection 26b, which is formed at the lower portion of the drive ring 26 and extending in a radial direction, and the other end hooked to a spring hook 28 disposed on the chassis 25. A locking pin 29 disposed on the chassis 25 regulates the rotating range of the drive ring 26 by contacting the locking projection 26b. Further, the drive ring 26 includes an engaging projection 26c at the upper portion thereof, which can engage with the engaging pin 13c when the aforesaid switch 13 is moved.

One end of the drive levers 22, 23 are rotatably engaged with pins 24 which are disposed on the surface of the light shading plates 21 on an object side, and arranged side by side in a horizontal direction. The other ends of the drive levers 22 are rotatably engaged with the pins 25a, respectively, which are formed to the chassis member 25. Similarly, the other ends of the drive levers 23 are rotatably engaged with the pins 26d formed to the drive ring 26. The aforesaid drive levers 22, 23 are connected to a connecting pin member 30 at the position where they intersect with each other so as to be rotatable about the connecting pin member 30.

Each of the upper and lower light shading plates 21 has two straight advance guide pins 21a protruding on the film side. The light shading plates 21 can be moved up and down and are supported in such a manner that the straight advance guide pins 21a are engaged with the corresponding straight advance guide grooves 25b formed on the chassis 25.

Figure 1:
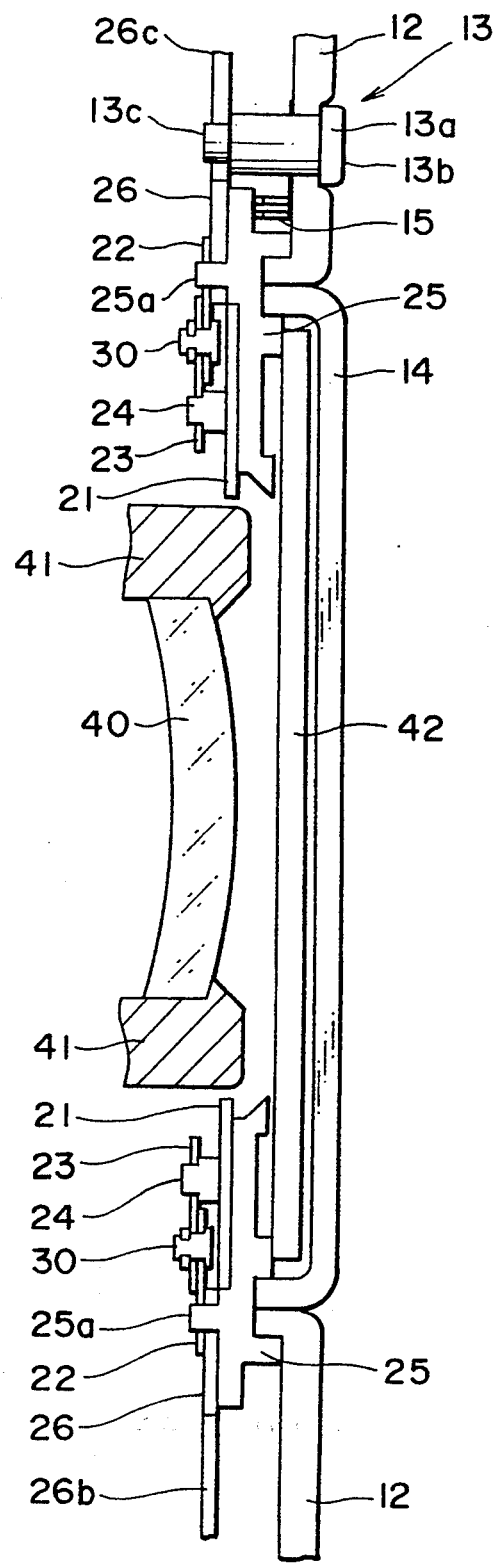
FIG. 1 is a top cross-sectional view showing the main structure of an embodiment of a camera to which the present invention is applied.
Figure 2:
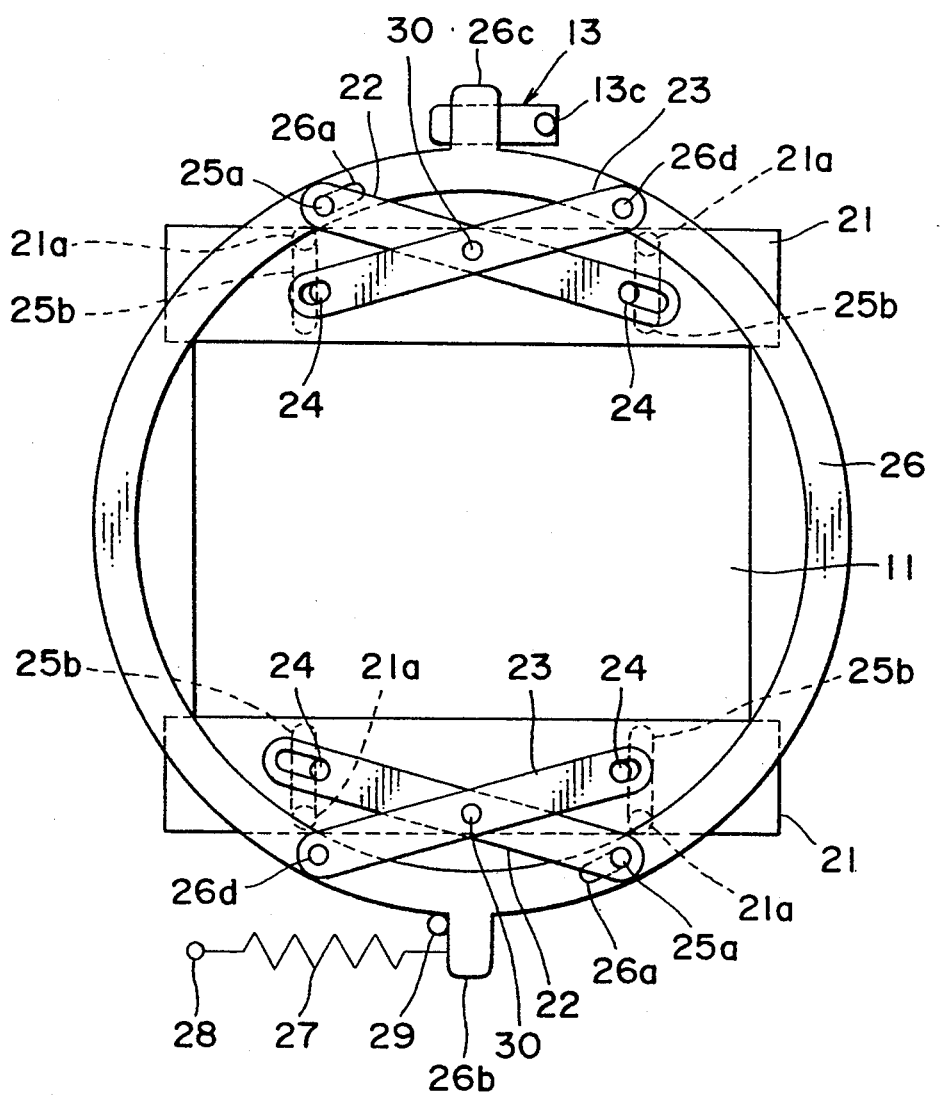
FIG. 2 is a schematic front view corresponding to FIG. 1 showing the main structure of the embodiment.

With the above arrangement, the camera 10 having the photographing aperture size changeover mechanism according to the present invention operates as follows. FIGS. 1 and 2 show the condition when the power supply circuit of the camera 10 is turned OFF. In this condition, the switch 13 is stopped by the click on the left side in FIG. 7 and the engaging pin 13c is not engaged with the engaging projection 26c. When the drive ring 26 is driven counterclockwise, the pair of upper and lower light shading plates 21 are moved toward the center of the opening 11. Since, however, the drive ring 26 is always forced clockwise by the spring 27, the light shading plates 21 remain at a retracted position in this condition. The camera 10 according to the present invention has a known structure such that when the power supply circuit is turned OFF, the photographing lens barrel 41 (photographing optical system) of the camera 10 retracts inward, and when the power supply circuit is turned ON, the photographing lens barrel 21 advances forward. Therefore, when the power supply circuit is turned OFF, the photographing lens barrel 41 is fully retracted in the optical axis direction, and since the light shading plates 21 do not advance into the opening 11 at this accommodated position, the accommodation of the photographing lens barrel 41 is completed without interference from the light shading plates 21. Note, a number 40 in the figure designates a rear group of the photographing lens system (photographing optical system).

Figure 3:
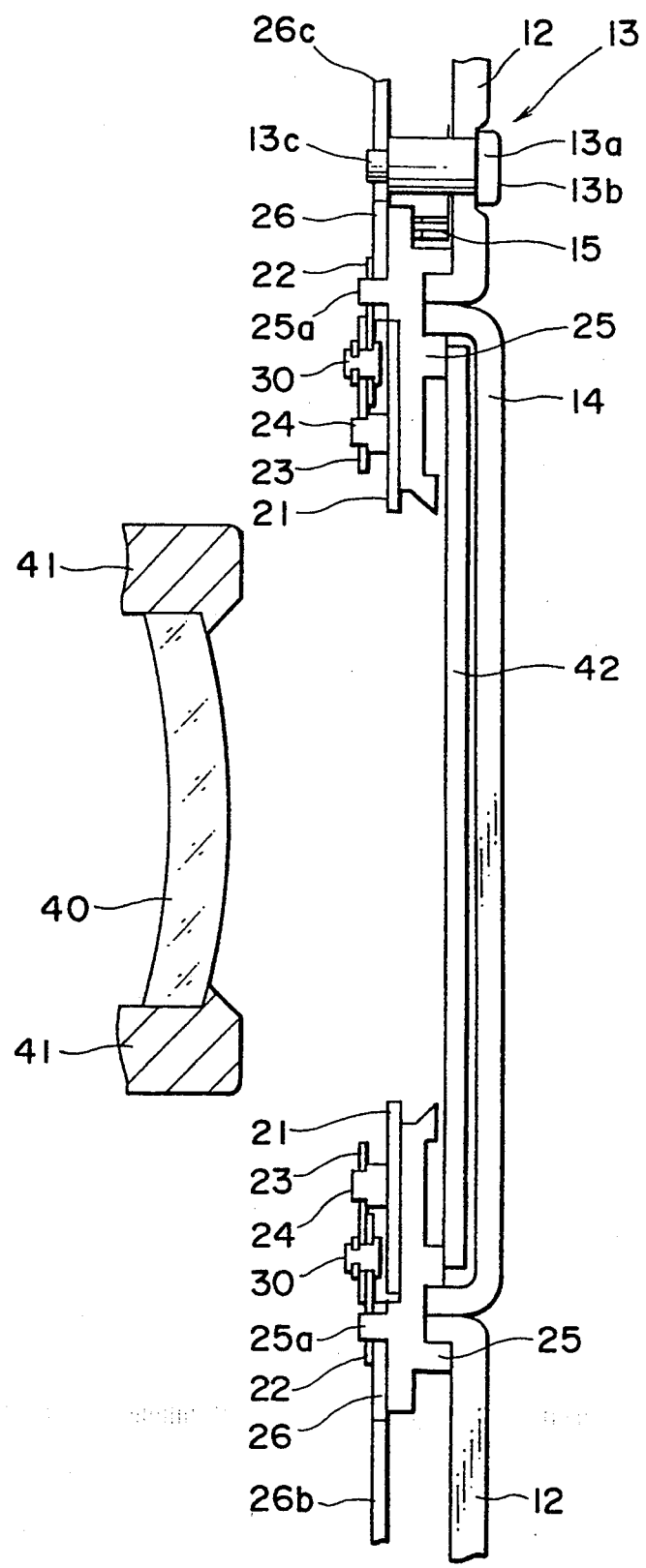
FIG. 3 is a top cross-sectional view showing the main structure of the embodiment in a state different from that shown in FIG. 1.
Figure 4:
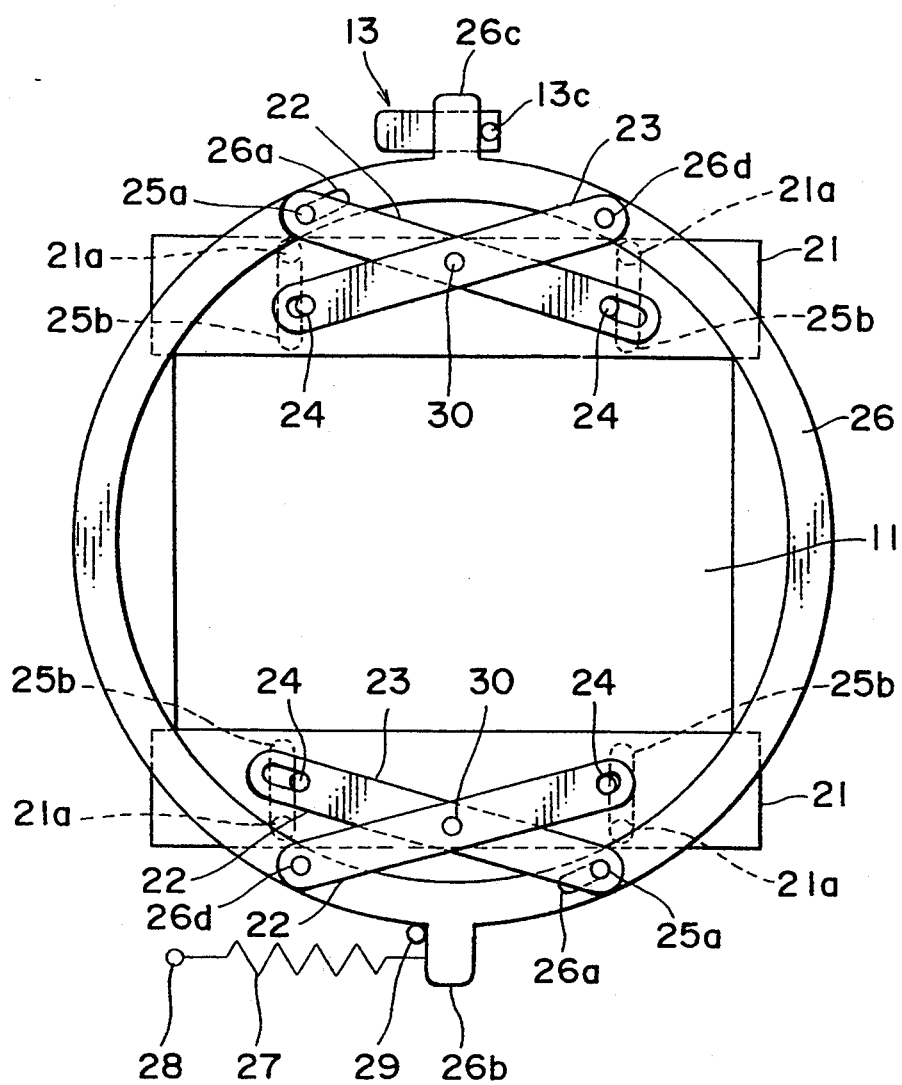
FIG. 4 is a schematic front view corresponding to FIG. 3 showing the main structure of the embodiment.

FIGS. 3 and 4 show the condition that photographing with a standard photographing aperture size is enabled. The switch 13 is in the condition shown in FIG. 7, i.e., in the click stop state at the mid position. Although the engaging pin 13c of the switch 13 contacts the engaging projection 26c, it does not move the engaging projection 26c left in the figure. Therefore, the light shading plates 21 are not moved from the state shown in FIG. 2 and remain in the retracted position (at the position of the large photographing aperture size). As soon as the power supply circuit is turned ON, the photographing lens barrel 41 advances toward the object and is ready for photographing. In this state, the engaging pin 13c does not necessarily contact the engaging projection 26c.

Figure 5:
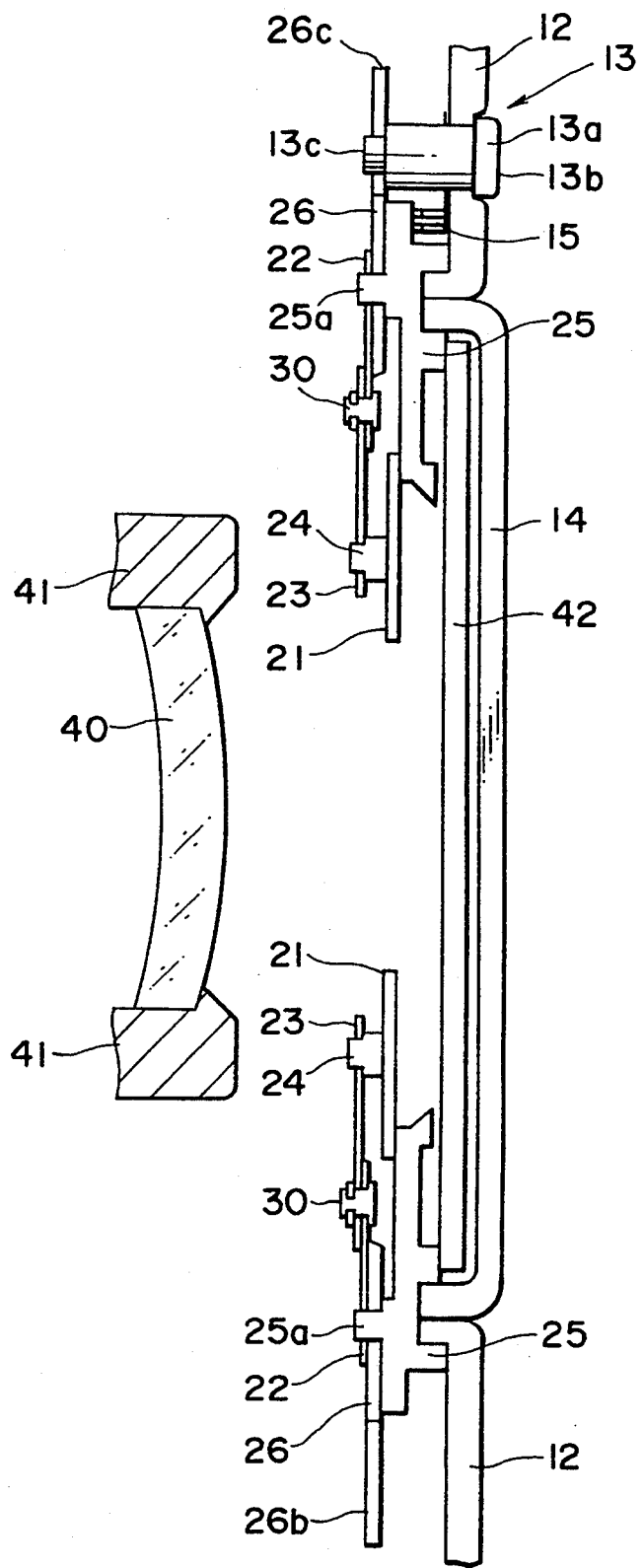
FIG. 5 is a top cross-sectional view showing the main structure of the embodiment in a state different from those shown in FIGS. 1 and 2.
Figure 6:
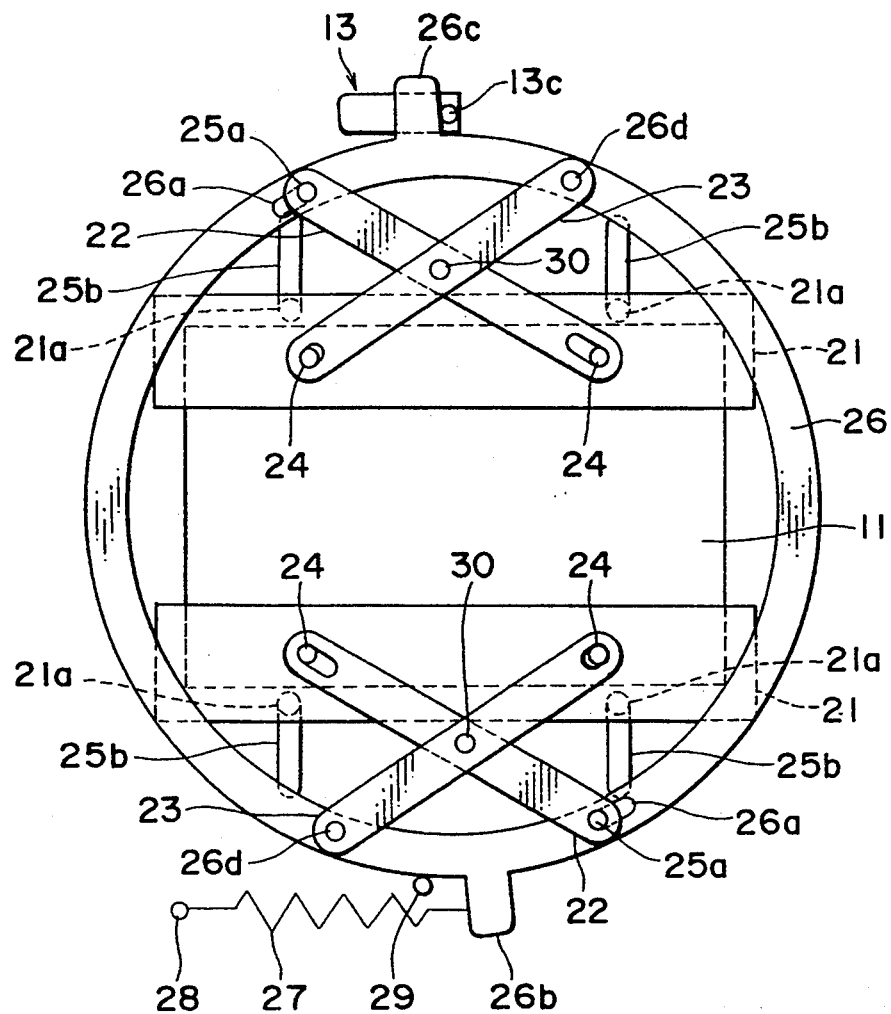
FIG. 6 is a schematic front view corresponding to FIG. 5 showing the vicinity of the main structure of the embodiment.

FIGS. 5 and 6 show the condition that photographing with a panorama photographing aperture size is enabled. In this condition, the switch 13 is further operated so that it is stopped by the click on the right side in FIG. 7. The engaging pin 13c of the switch 13 further depresses the engaging projection 26c to the left as shown in the figure. The drive ring 26 is thus rotated clockwise. The rotation of the drive ring 26 causes the light shading plates 21 to advance towards the center of opening 11. The drive levers 23, connecting pin members 30, drive levers 22 and pins 24 move to change the photographing aperture size to the panorama size. Note, the force holding (i.e., click stopping) the switch 13 is stronger than the return force of the spring 27.

When the photographing enabling state in the panorama size shown in FIGS. 5 and 6 is changed to the standard photographing aperture size or to the condition that the power supply circuit is turned OFF, the engaging pin 13c of the switch 13 is released from the engagement with the engaging projection 26c of the drive ring 26. Therefore, the drive ring 26 is rotated clockwise by the force of the spring 27, and the light shading plates 21 are retracted to be away from each other.

Next, another embodiment will be described with reference to FIGS. 11 to 19. In the following description, the same numbers as used in the foregoing embodiment are used to designate the same components. A switch 50 in this embodiment does not function as the power supply switch. An operating switch (not shown) which operates the power supply circuit is provided with a camera 10 as a separate switch.

Figure 11:
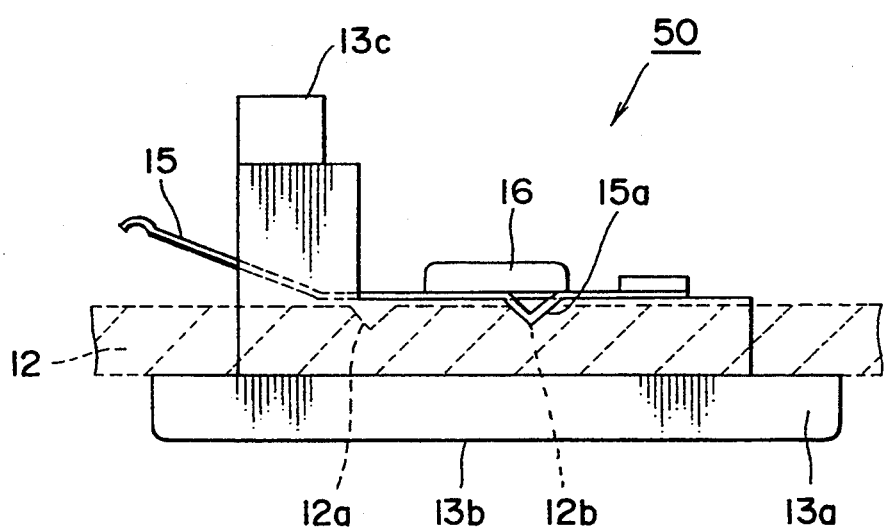
FIG. 11 is a top view of a switch in an embodiment different from that shown in FIG. 1.

As shown in FIG. 11, the switch 50 includes two click stop positions on the right and left sides. Therefore, the groove 12c provided for the switch 13 is not provided for the switch 50. The switch 50 includes a contact brush 15 having an engaging portion 15a. When the engaging portion 15a is engaged with a groove 12a, i.e., when the engaging portion 15a is on the left side, photographing with a standard photographing aperture size is enabled, whereas when it is on the right side, photographing with a panorama photographing aperture size is enabled. The contact brush 15 is used as a switch for the changeover of a light emitting unit (not shown) for recording photographing data such as a date, time etc. or a photographing film, or the changeover of a light measuring range in accordance with the difference in size between the picture photographed in the standard size mode, the panorama size mode, or the like.

Figure 13:
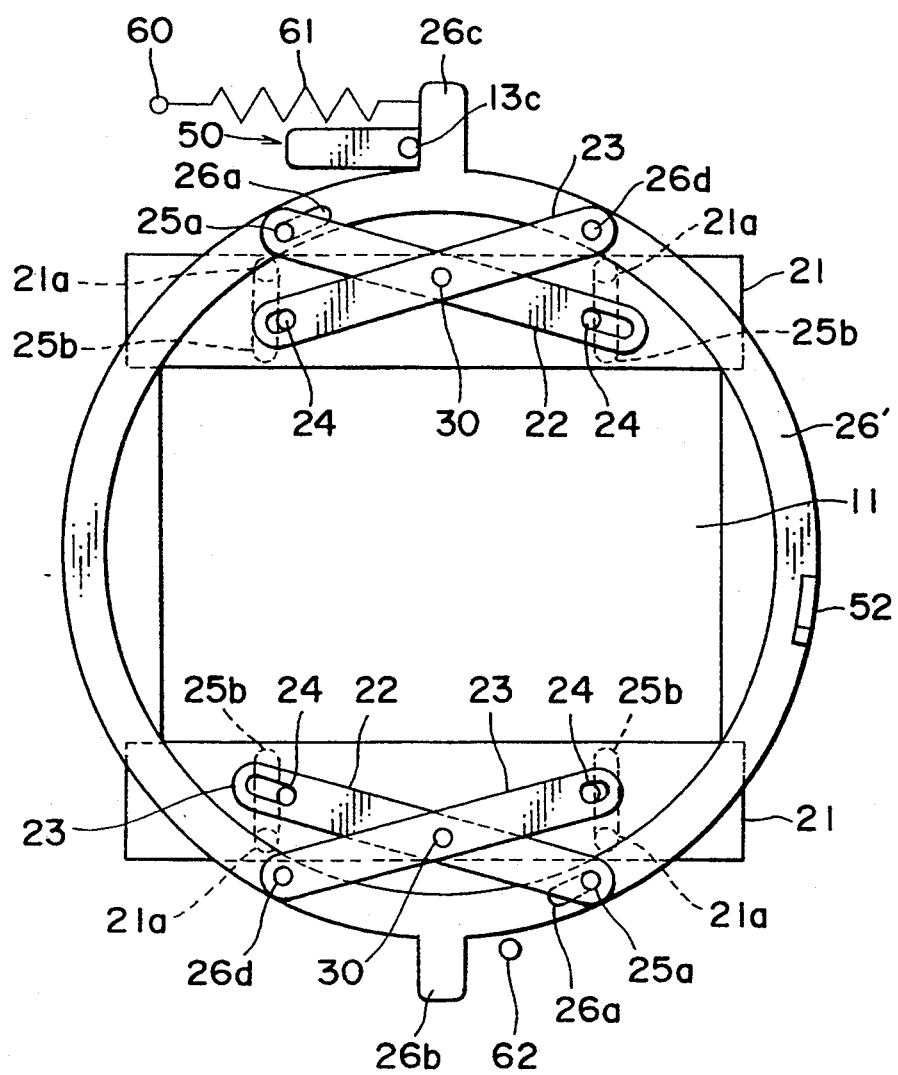
FIG. 13 is a schematic front view corresponding to FIG. 12 showing the main structure of the embodiment.

A drive ring 26' in this embodiment is biased in the counterclockwise direction (as shown in FIG. 13) by a spring 61. The spring 61 has an end hooked to the engaging projection 26c which is disposed on the upper side of the drive ring and extending in a radial direction. The other end is hooked to the spring hook 60 provided on a chassis 25. The locking pin 62 provided on the chassis 25 regulates the rotating range of the drive ring 26' by contacting a locking projection 26b. The engaging projection 26c can be engaged with the engaging pin 13c of the switch 50.

This embodiment is characterized by the drive ring lever 52 provided with the drive ring 26' and the drive pin 51 provided with a photographing lens barrel 41'. When the power supply circuit is turned OFF, the action of the drive ring lever 52 and drive pin 51 causes the light shading plates 21 to be retracted outside the opening 11 as the photographing lens barrel 41' is retracted into the opening 11. This is described in detail below.

Figure 12:
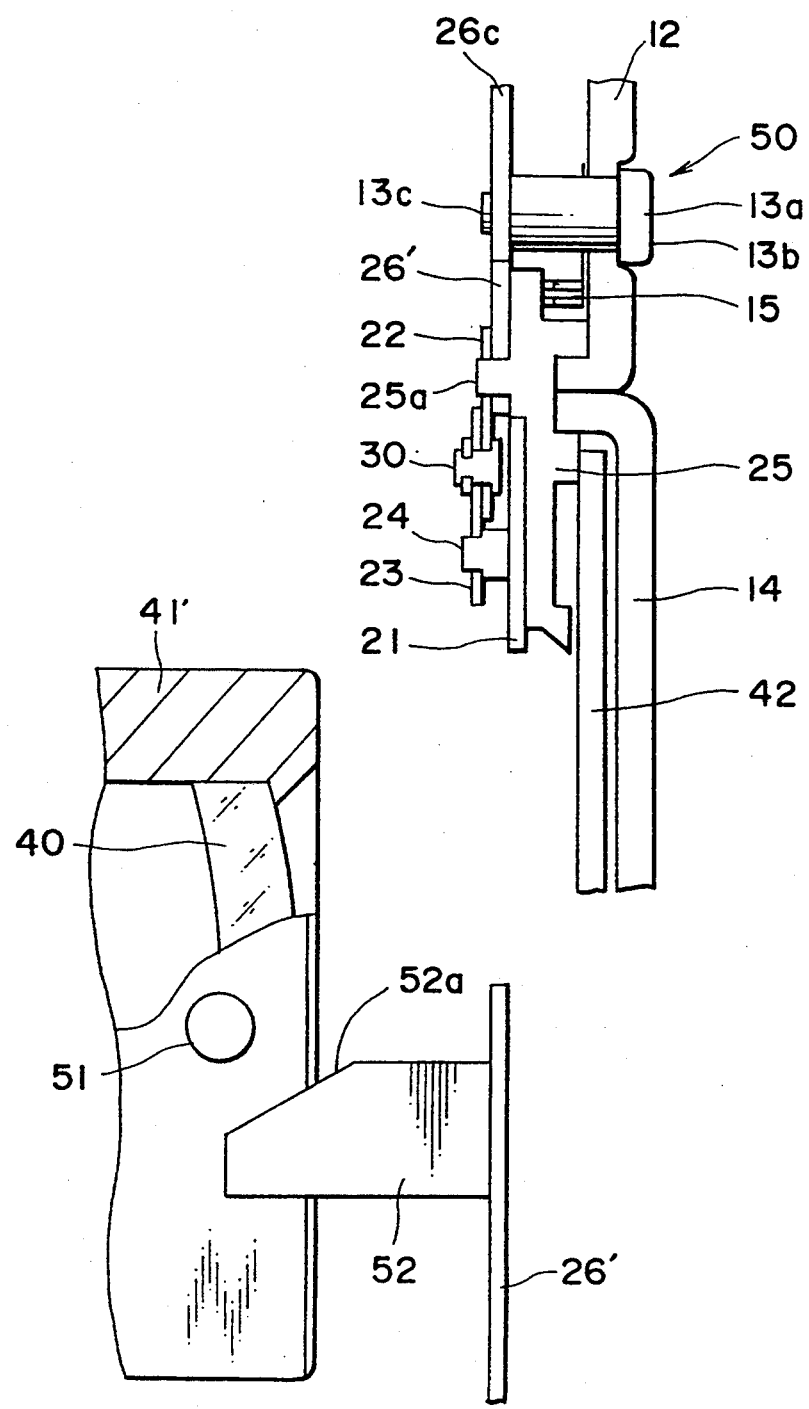
FIG. 12 is an explanatory diagram showing the main structure of the embodiment.

FIGS. 12 and 13 show photographing with a standard photographing aperture size enabled. In this condition, the switch 50 is stopped by the click on the left side as shown in FIG. 11. The engaging pin 13c contacts the engaging projection 26c against the rotating force to prevent the counterclockwise rotation of the drive ring 26'. This is realized since the force holding the switch 50 is stronger than the force of spring 61. Note, when the switch of the power supply circuit (not shown) is turned OFF in this condition, the light shading plates 21 are already located outside the opening 11 and thus no problem arises when the photographing lens barrel 41' is retracted inward.

Figure 14:
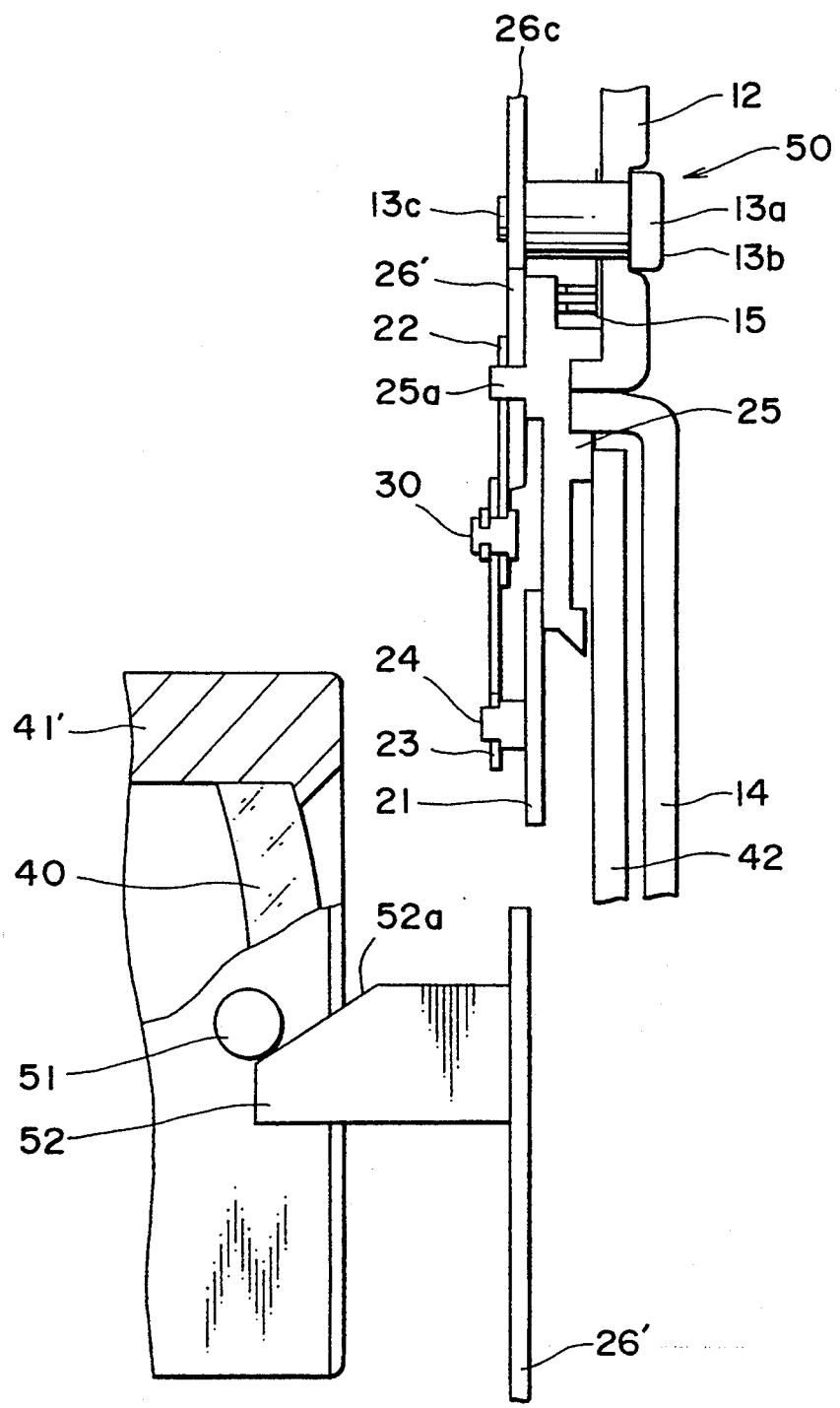
FIG. 14 is an explanatory diagram showing the main structure of the embodiment in a state different from that shown in FIG. 12.
Figure 15:
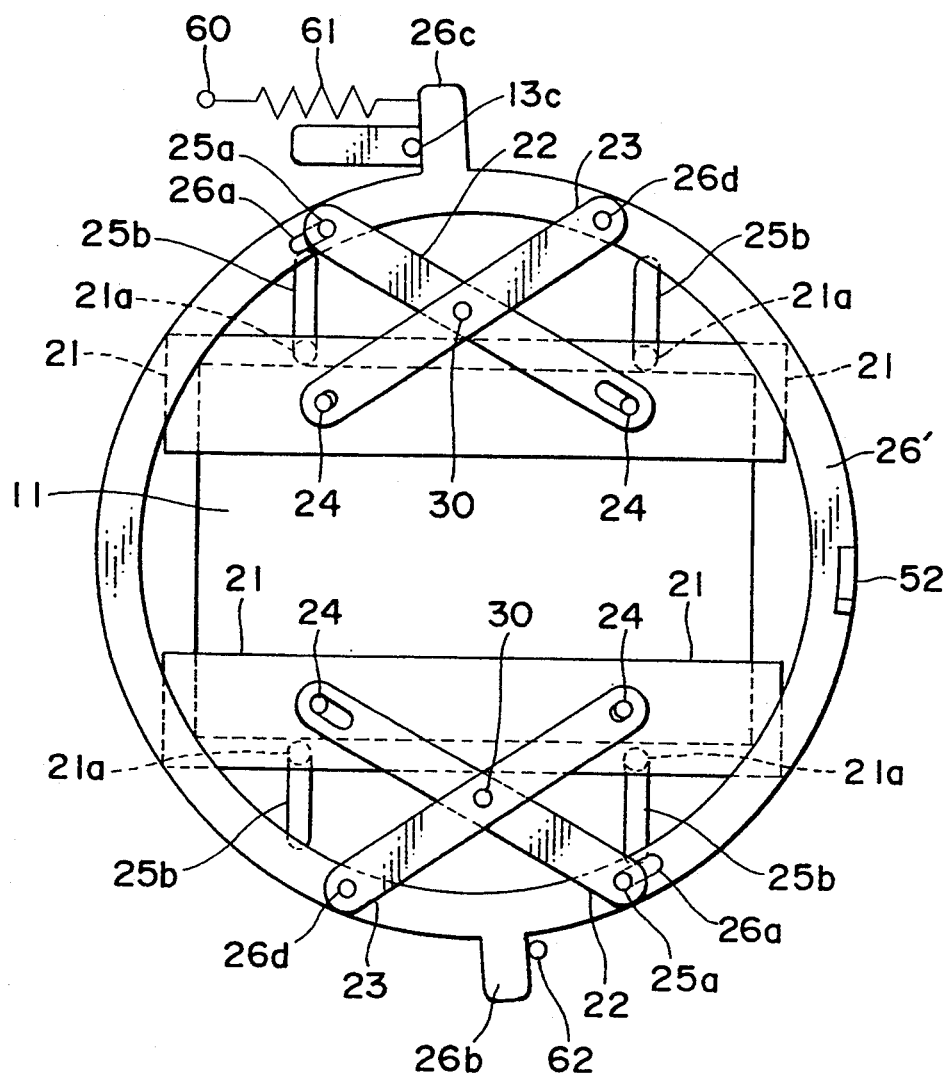
FIG. 15 is a schematic front view corresponding to FIG. 14 showing the main structure of the embodiment.

FIGS. 14 and 15 show photographing with the panorama photographing aperture size enabled. The switch 50 is stopped by a click on the right side as shown in FIG. 11. The engagement pin 13c is moved to the left, as shown in FIG. 15, when the switch main body 13a is moved. Therefore, the drive ring 26' rotates counterclockwise as shown in the figure as the engaging pin 13c is moved left. As a result, the light shading plates 21 move toward the center of opening 11 to enable photographing in the panorama photographing aperture size.

Figure 16:
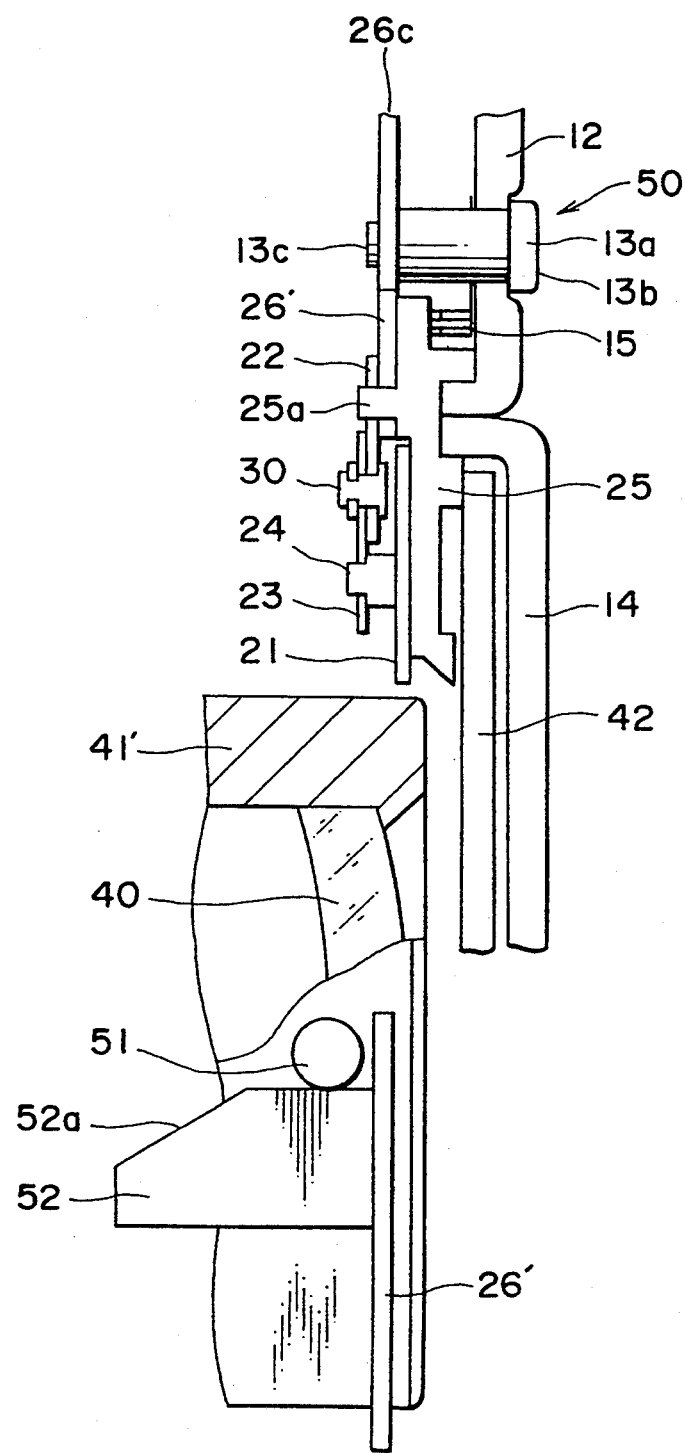
FIG. 16 is an explanatory diagram of the main structure of the embodiment in a state different from those shown in FIGS. 1 and 2.
Figure 17:
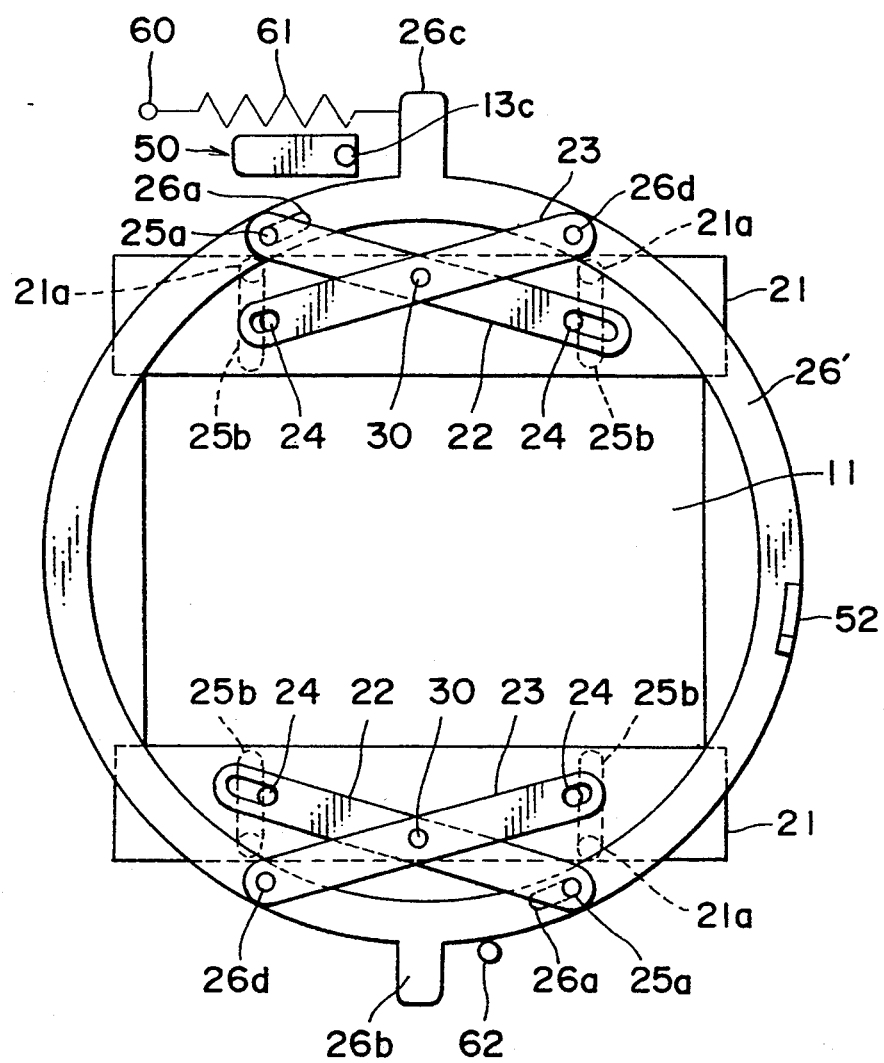
FIG. 17 is a schematic front view corresponding to FIG. 16 showing the main structure of the embodiment.

FIGS. 16 and 17 show the condition that the switch of the power supply circuit (not shown) is turned OFF when the photographing in the panorama photographing aperture size is enabled. The photographing lens barrel 41' includes a drive pin 51 projecting in a radial direction on the outer surface of the lens barrel 41. The drive ring 26' is provided with a drive lever 52 located at the position corresponding to the drive pin 51 and projecting in the object direction. With this arrangement, when the power supply circuit is turned OFF, the drive pin 51 comes into sliding contact with the inclined portion 52 of the drive lever 51 as the photographing lens barrel 41' retracts. Then the drive ring lever 52 is moved down in the figure, and thus the drive ring 26' is rotated clockwise in the figure. Accordingly, the light shading plates 21 retract from the opening 11 (i.e., move away from each other). Therefore, since the light shading plates 21 are retracted before the photographing lens barrel 41 is retracted, the retraction of the photographing lens barrel 41 can be completed without interference from the light shading plates 21.

Although only one drive pin 51 is provided on the photographing lens barrel 41', and one drive lever 52 corresponding to the drive pin 51 is provided on the drive ring 26' in this embodiment, a plurality of drive pins 51 and corresponding number of drive levers 52 can be provided.

Figure 18:
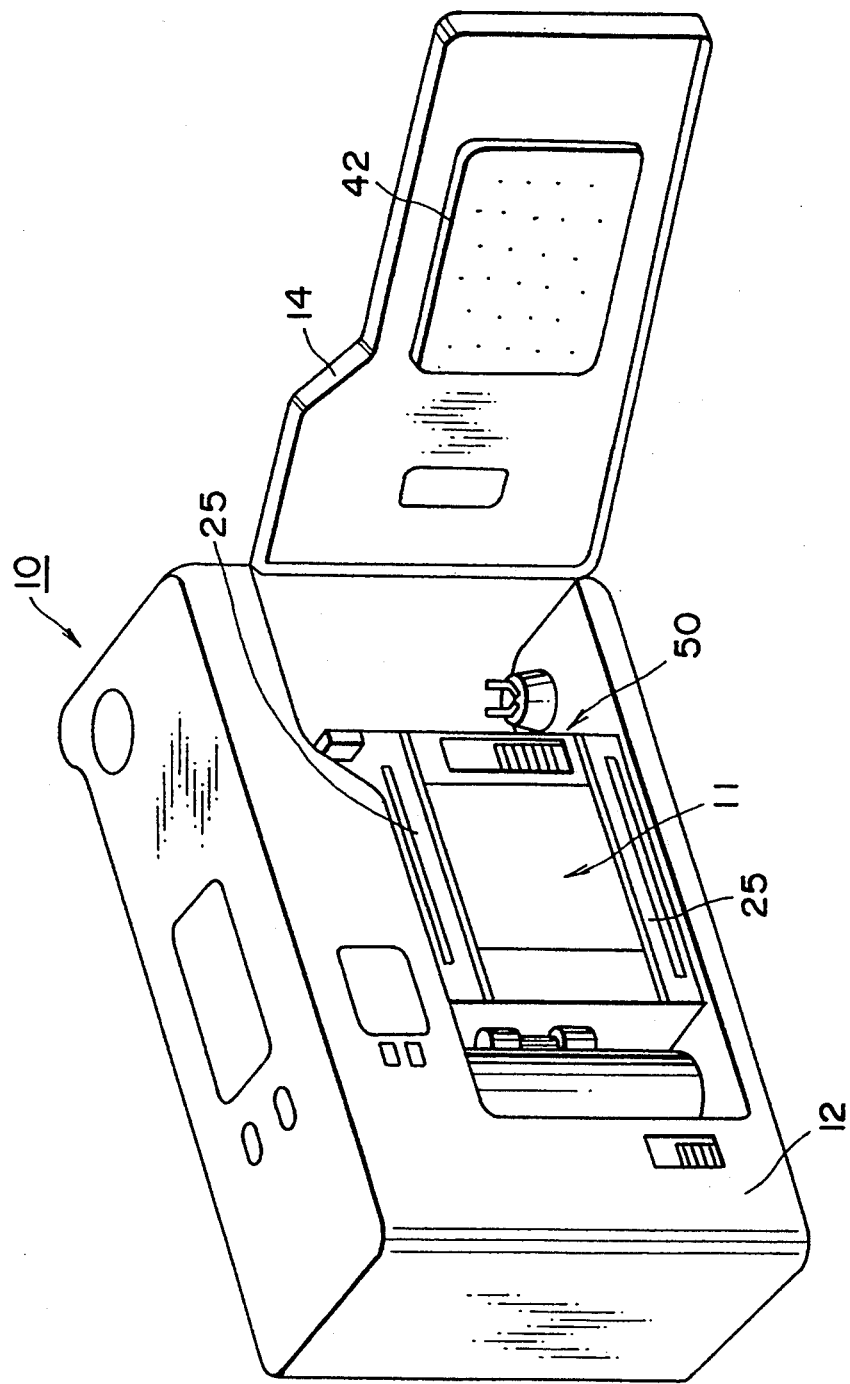
FIG. 18 is an external perspective view of a camera of the embodiment in which the operating switch of a photographing aperture size changeover mechanism is located at a different position in the camera.
Figure 19:
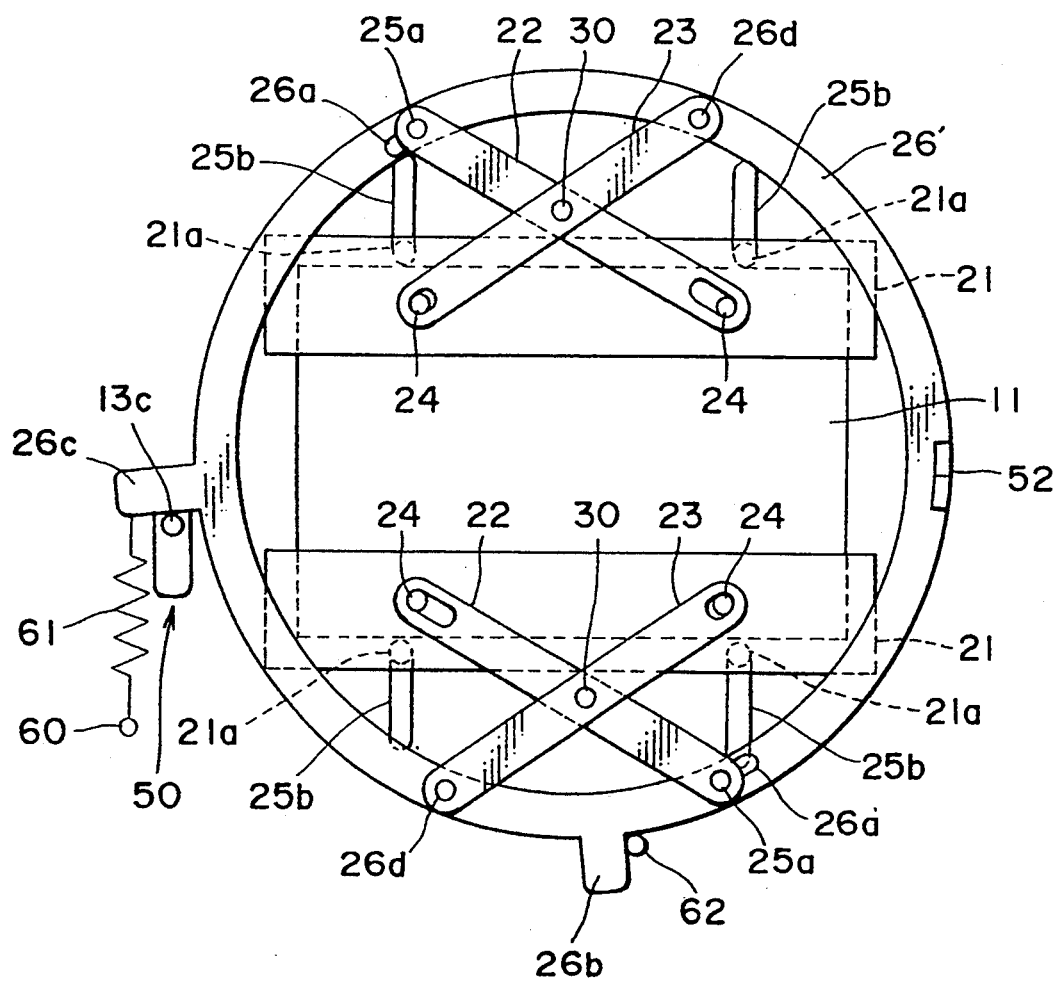
FIG. 19 is a schematic front view corresponding to FIG. 18 showing the main structure of the embodiment.

Further, although the switch 50 is located at the upper portion of a rear wall 12 in this embodiment, it may be provided inside the camera 10 and can only be changed when the rear cover 14 is opened (see FIGS. 18 and 19).

Although the small photographing aperture size is defined as the panorama photographing aperture size in the above two embodiments, the light shading plates may be arranged to move in a horizontal direction (i.e., in a film feed direction) so that the small photographing aperture size is defined as a half photographing aperture size.

The changeover means in this embodiment is not limited to the power supply switch for turning ON/OFF the power supply. For example, in the case of a camera with a lens protection barrier or the like, by which the front surface of a lens is opened when a picture is taken and it is closed when a picture is not taken, an operation means for opening/closing the lens protection barrier may be used as the changeover means.

As apparent from the foregoing descriptions, according to the camera having the photographing aperture size changeover mechanism of the present invention, when a photographing prohibition mode is set by turning OFF a power supply switch, or the like, a partial light shading member can be retracted outside the opening. Therefore, the rear group of photographing lenses or the lens barrel that supports the rear lens group is retracted to an area without being restricted by the photographing aperture size changeover mechanism. Thus a camera having a reduced size and thickness can be realized.

What is claimed is:

1. A camera capable of photographing with a plurality of predetermined photographing aperture sizes, said camera comprising:

means for defining a largest one of said plurality of photographing aperture sizes;

at least one plate member movable in a movement plane for converting a photographing aperture size to a smaller photographing aperture size, selected from said plurality of predetermined photographic aperture sizes;

an optical system capable of advancing and retracting with respect to a body of said camera, said optical system intersecting with said movement plane of said at least one movable plate member, and a rearmost surface of said optical system being positioned rearwardly of said movement plane when said optical system retracts; and control means for moving said at least one movable plate member so as not to interfere with retraction of said optical system when said optical system retracts.

2. The camera according to claim 1, wherein said control means comprises a mechanism for changing a photographing aperture size, wherein said mechanism, in a rest position, is biased to set the photographing aperture size to said largest one of said plurality of photographing aperture sizes, and wherein a smaller one of said plurality of photographing aperture sizes is set when said mechanism is driven against a biasing force.

3. The camera according to claim 2, wherein said control means comprises an operation member for driving said mechanism, said operation member being capable of turning on or off a power of said camera, and wherein said operation member does not drive said mechanism when said operation member turns off the power.

4. The camera according to claim 2, wherein said mechanism is controlled to set said largest photographing aperture size when said optical system is retracted, even if said a smaller one of said plurality of photographing aperture sizes is currently set.

5. The camera according to claim 4, wherein said control means comprises an operation member for driving said mechanism, said operation member being capable of turning on or off a power of said camera, wherein said operation member does not drive said mechanism when said operation member turns off the power, and wherein a cam structure is provided between said optical system and said mechanism, said cam structure driving said mechanism to set said largest one of said plurality of photographing aperture sizes when said optical system is retracted.

6. The camera according to claim 1, wherein said control means comprises a mechanism for changing a photographing aperture size, wherein said mechanism is biased such that said mechanism, in its rest position, sets the photographing aperture size to a smaller one of said plurality of photographing aperture sizes, and wherein said largest one of said plurality of photographing aperture sizes can be set when said mechanism is driven against a biasing force thereof.

7. The camera according to claim 1, said control means for moving comprising means for moving said at least one movable plate member to said largest one of said plurality of photographing aperture sizes in association with movement of said optical system to a retracted position.

8. The camera according to claim 1, further comprising means for advancing and retracting said optical system with respect to a body of said camera, a retracting movement of said optical system to a photographing prohibited position intersecting the movement plane of said at least one movable plate member.

9. The camera according to claim 1, at least one of said plurality of photographing aperture sizes comprising a panoramic aperture size defined by an aspect ratio different than an aspect ratio of said largest of said plurality of photographing aperture sizes.

10. The camera according to claim 1, said control means for moving comprising means for moving said at least one movable plate member in association with movement of said optical system to a photographing prohibited position.

11. The camera according to claim 1, said control means for moving comprising means for moving said at least one movable plate member along a direction of movement substantially perpendicular to a direction of film movement and within a plane parallel to a plane of film movement.

12. The camera according to claim 1, said at least one movable plate member comprising two movable plate members, and said control means for moving comprising a rotatable annular member and means for converting rotational movement of said rotatable annular member to translational movement of said plate members, wherein each of said plate members are coupled to said rotatable annular member at diametrically opposed positions on said rotatable annular member.

13. The camera according to claim 1, further comprising manually actuatable means for selecting a photographing aperture size from said plurality of photographing aperture sizes.

14. The camera according to claim 13, said selecting means comprising means for selecting said largest one of said plurality of photographing aperture sizes when a power supply to said camera is turned OFF and when a power supply to said camera is turned ON.

15. The camera according to claim 14, said selecting means comprising means for selecting a photographing aperture size other than said largest one of said plurality of photographing aperture sizes only when a power supply to said camera is turned ON.

16. The camera according to claim 1, said control means for moving comprising means for moving said at least one movable plate member independently of a position of said optical system along an optical axis of said optical system within a range where photographing is permitted.

17. The camera according to claim 1, translation of said at least one plate member defining said movement plane.

18. A camera capable of photographing with a plurality of photographing aperture sizes, said camera comprising:
    means for defining a largest one of said plurality of photographing aperture sizes;
    at least one plate member movable within a movement plane for converting a photographing aperture size to a photographing aperture size which is smaller than said largest one of said plurality of photographing aperture sizes;
    a retractable optical system, wherein said retractable optical system is advanced when photographing is enabled, and is retracted inwardly when photographing is prohibited, said optical system intersecting with said movement plane of said at least one movable plate member, a rearmost surface of said optical system positioned inwardly of said movement plane when said optical system is retracted; and
    control means for moving said at least one movable plate member so as not to interfere with retraction of said optical system when photographing is prohibited.

19. The camera according to claim 18, wherein said control means comprises a mechanism for changing a photographing aperture size, wherein said mechanism, in its rest position, is biased to set the photographing aperture size to said largest one of said plurality of photographing aperture sizes, and wherein a smaller one of said plurality of photographing aperture sizes is set when said mechanism is driven against a biasing force.

20. The camera according to claim 19, wherein said control means comprises an operation member for driving said mechanism, said operation member being capable of turning on or off a power of said camera, and wherein said operation member does not drive said mechanism when said operation turns off the power.

21. The camera according to claim 19, wherein said mechanism is controlled to set said largest photographing aperture size when said optical system is retracted, even if said smaller one of said plurality of photographing aperture sizes is currently set.

22. The camera according to claim 21, wherein said control means comprises an operation member for driving said mechanism, said operation member being capable of turning on or off a power of said camera, wherein said operation member does not drive said mechanism when said operation turns off the power, and wherein a cam structure is provided between said optical system and said mechanism, said cam structure driving said mechanism to set the said largest one of said plurality of photographing aperture sizes when said optical system is retracted.

23. The camera according to claim 18, wherein said control means comprises a mechanism for changing a photographing aperture size, wherein said mechanism, in its rest position, is biased such to set the photographing aperture size to a smaller one of said plurality of photographing aperture sizes, and wherein said largest one of said plurality of photographing aperture sizes can be set when said mechanism is driven against a biasing force thereof.

24. The camera according to claim 18, said control means for moving comprising means for moving said at least one movable plate member to said largest one of said plurality of photographing aperture sizes in association with movement of said retractable optical system to a retracted, photographing prohibited position.

25. The camera according to claim 18, further comprising means for advancing and retracting said retractable optical system with respect to a body of said camera, a retracting movement of said optical system to a photographing prohibited position intersecting the movement plane of said at least one movable plate member.

26. The camera according to claim 18, at least one of said plurality of photographing aperture sizes comprising a panoramic aperture size defined by an aspect ratio different than an aspect ratio of said largest of said plurality of photographing aperture sizes.

27. The camera according to claim 18, said control means for moving comprising means for moving said at least one movable plate member in association with movement of said retractable optical system to a photographing prohibited position.

28. The camera according to claim 18, said control means for moving comprising means for moving said at least one movable plate member along a direction of movement substantially perpendicular to a direction of film movement and within a plane parallel to a plane of film movement.

29. The camera according to claim 18, said at least one movable plate member comprising two movable plate members, said control means for moving comprising a rotatable annular member and means for converting rotational movement of said rotatable annular member to a translational movement of said plate members, wherein each of said plate members are coupled to said rotatable annular member at diametrically opposed positions on said rotatable annular member.

30. The camera according to claim 18, further comprising manually actuatable means for selecting a photographing aperture size from said plurality of photographing aperture sizes.

31. The camera according to claim 30, said selecting means comprising means for selecting said largest one of said plurality of photographing aperture sizes when a power supply to said camera is turned OFF and when a power supply to said camera is turned ON.

32. The camera according to claim 31, said selecting means comprising means for selecting a photographing aperture size other than said largest one of said plurality of photographing aperture sizes only when a power supply to said camera is turned ON.

33. The camera according to claim 18, said control means for moving comprising means for moving said at least one movable plate member independently of a position of said retractable optical system along an optical axis of said retractable optical system within a range where photographing is permitted.

34. The camera according to claim 18, translation of said at least one plate member defining said movement plane.

* * * * *